(12) United States Patent
Bradfield

(10) Patent No.: US 6,351,046 B1
(45) Date of Patent: Feb. 26, 2002

(54) COMPACT DYNAMOELECTRIC MACHINE

(75) Inventor: Michael Duane Bradfield, Anderson, IN (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/482,368

(22) Filed: Jan. 13, 2000

(51) Int. Cl.[7] ............................................... H02K 5/16
(52) U.S. Cl. ............................ 310/90; 310/62; 310/63
(58) Field of Search ........................ 310/90, 261, 263, 310/231, 232, 58, 75 D, 62, 63

(56) References Cited

U.S. PATENT DOCUMENTS

| | | | | |
|---|---|---|---|---|
| 1,684,168 A | * | 9/1928 | Bethel et al. | 310/63 |
| 3,610,976 A | * | 10/1971 | Wightman | 310/60 |
| 4,680,493 A | * | 7/1987 | Ziegler et al. | 310/62 |
| 5,194,770 A | * | 3/1993 | Yoshioka et al. | 310/51 |
| 5,317,224 A | * | 5/1994 | Ragaley | 310/58 |
| 5,550,418 A | * | 8/1996 | Chung | 310/239 |
| 5,720,685 A | * | 2/1998 | Malone | 474/190 |
| 5,789,832 A | * | 8/1998 | Hwang | 310/43 |
| 5,831,368 A | * | 11/1998 | Hatsios et al. | 310/217 |

FOREIGN PATENT DOCUMENTS

| | | | | |
|---|---|---|---|---|
| FR | 2 525 040-a | * | 10/1983 | 310/263 |
| JP | 60-197136-a | * | 10/1985 | 310/62 |
| JP | 04285448-a | * | 10/1992 | 310/63 |
| JP | 06284633-a | * | 10/1994 | 310/90 |

* cited by examiner

Primary Examiner—Nestor Ramirez
Assistant Examiner—Thanh Lam
(74) Attorney, Agent, or Firm—Margaret A. Dobrowitsky

(57) ABSTRACT

A dynamoelectric machine having a single internal centrifugal fan and a bearing design that places a bearing outboard of the pulley to produce a more compact and less expensive device. One bearing is mounted outboard of the pulley, substantially reducing or eliminating cantilever forces on the pulley. The pulley and fan are designed with an inner diameter in a shape to fit splines which are part of the rotor shaft, eliminating the need for any type of axial clamping nut.

15 Claims, 2 Drawing Sheets

COMPACT DYNAMOELECTRIC MACHINE

TECHNICAL FIELD

The present invention relates to an electric alternator or generator, having a compact size and improved bearing support properties, and improved cooling characteristics.

BACKGROUND OF THE INVENTION

Electric motors or alternators (dynamoelectric machines) having a stator secured within the housing of the machine and a rotor assembly that extends axially through the motor or generator are well known. Air cooling is typically provided by a centrifugal fan attached to the rotor assembly. Support bearings for the rotor assembly are typically positioned "inboard" of the pulley that turns the rotor of the generator via a fan belt from the engine, the pulley also being attached to the rotor assembly. Such devices desirably put as little stress as possible on the bearings that support the rotor assembly, to reduce the torque required to turn the rotors and to prolong the life of the bearings and the pulley. Conventional arrangements subject the bearings to a cantilever force from the fan belt. It is therefore one objective of the present invention to provide a motor with a design that minimizes the stress on the bearings.

Electric machines of this type are typically designed to fit into tight spaces, and therefore desirably are made as compact as possible. It is therefore another objective of the present invention to provide a design that results in a compact machine.

SUMMARY OF THE INVENTION

In order to achieve the foregoing objectives the overall layout and design of the present invention produces a smaller size while also providing reduced pulley and bearing stress. The invention accomplishes this objective through an internal, single fan design and a new arrangement of the front bearings and pulley, locating the front bearings outboard of the pulley, which shortens the length of the machine. An electric motor or generator built according to the present invention comprises a drive end frame assembly and slip ring frame assembly that house a stator assembly, a rotor assembly, a rectifier assembly, and a brush-holder/regulator assembly. Cooling air is pulled axially through the machine by an internal centrifugal fan located towards the front of the housing. Through an innovative frame assembly and stack up design, no wall is present between the fan and the pulley, as is typically the case in conventional designs. The removal of the wall reduces the overall length of the generator and allows the outer diameter of the fan to be as large as the outer diameter of the stator. The increased diameter of the fan significantly increase the airflow generated by the fan, resulting in at least two benefits: the cooling capacity of the single fan is substantially increased; and the higher exhaust velocity increases the amount of cooling air that is recirculated through the unit. The air exhausts through scroll diffuser vanes which increase the exhaust flow rates while maintaining the safety of an internal fan arrangement. The increased flow capacity of the invention results in cooler operating temperatures, increased electrical output and longer lasting equipment.

The bearings of the present invention that support the rotor shaft are located on each outside end of the rotor shaft. The front bearing that supports the rotor shaft is installed outboard of the pulley, significantly lowering the load on the bearings and the rotor shaft by eliminating or significantly reducing the cantilever force from the drive belt. The pulley is sandwiched between the bearing and a housing segment, and transmits torque to the rotor shaft through use of multiple spines that engage form-fit apertures on the inside diameter of the pulley. Unlike many conventional designs, no axial clamping nut is necessary in the present invention. This design allows the use of plastic pulleys, reducing manufacturing costs and weight. The compact nature of this design make it possible to install this invention in smaller spaces than conventional designs.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
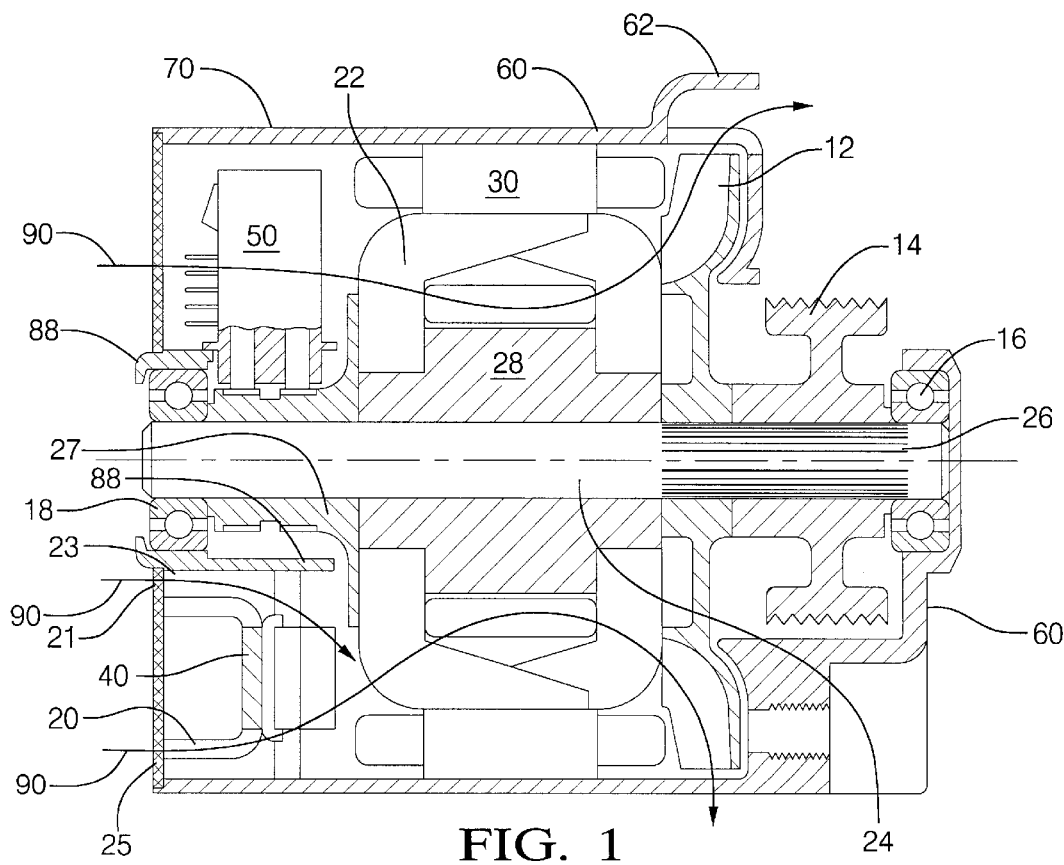
FIG. 1 is a longitudinal sectional view of an electric machine constructed according to the invention.
Figure 3:
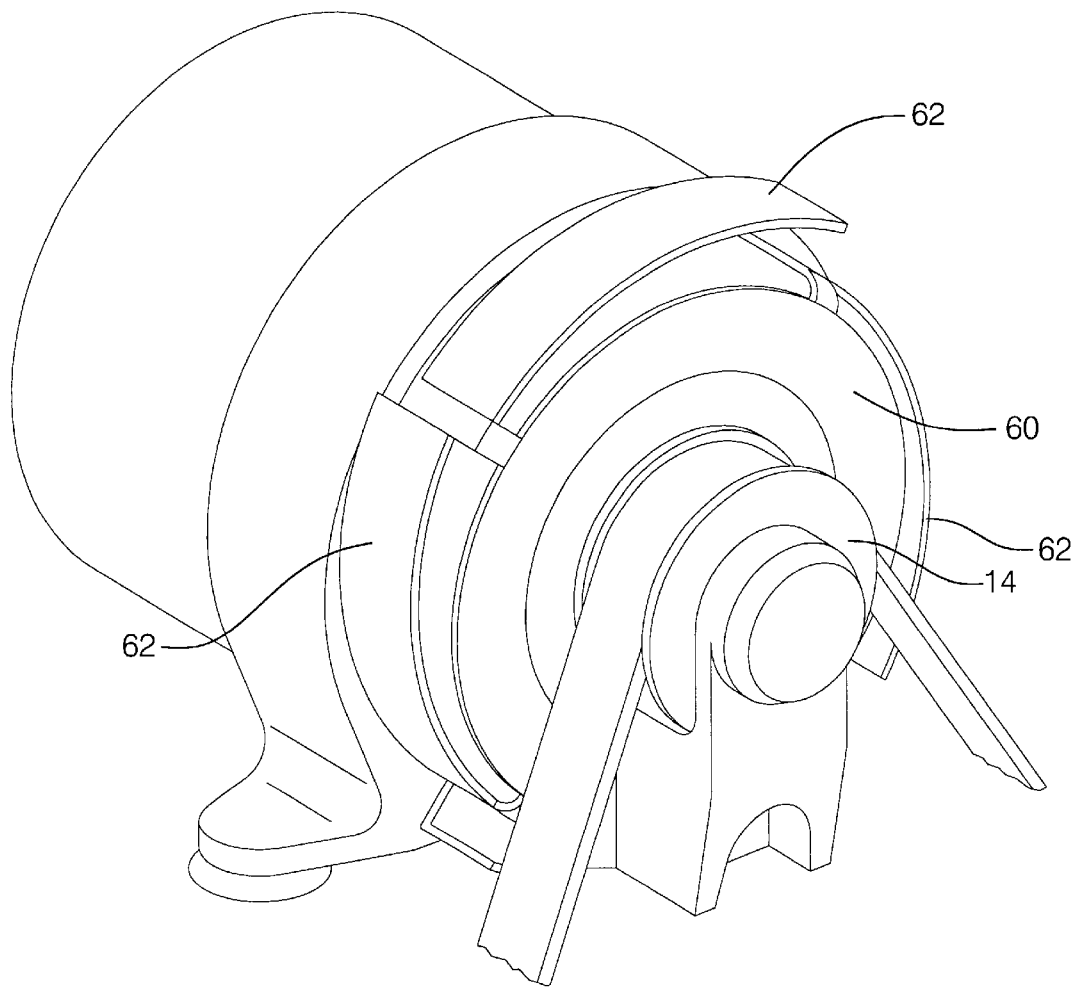
FIG. 3 is a perspective view of a plurality of scroll diffuser vanes.

Referring first to FIG. 1, a drive end frame assembly 60 is attached to a slip ring frame assembly 70 via conventional means. The frame assemblies house a rotor assembly 10, stator assembly 30, rectifier assembly 40, and brush-holder assembly 50. The rotor assembly comprises, in order of assembly from the front of the invention, a front bearing 16, a pulley 14, a centrifugal fan 12, a pair of pawl shaped pole core 22, a core and coil assembly 28, a slip ring assembly 27, a rotor shaft 24, and a rear bearing 18. These parts are "stacked" together via known techniques and installed into the drive end frame assembly 60 and the slip ring frame assembly 70. The centrifugal fan 12 preferably has an outer diameter equal to the outer diameter of the end turns of the stator assembly 30. This increased outer diameter allows the fan to generate a higher volume of air flow, increasing the cooling capacity of the invention, and, together with the scroll diffuser vanes 62 (best shown in FIG. 3), a higher exhaust velocity, reducing the amount of cooling air that is recirculated through the invention. As the centrifugal fan 12 spins, it draws air that is recirculated through the invention. As the centrifugal fan 12 spins, it draws air through an outer radial gap 25 and an inner radial gap 23 in a axial direction through the invention, with the cooling flow exiting through diffuser vanes 62. This flow is shown by arrows 90. The outer radial gap 25 is between the cooling fin 20 and the slip ring frame assembly 70, and the inner radial gap 23 is between cooling fin 22 and the rear bearing retainer 88. These gaps provide low air flow restriction intakes which lead to greater cooling properties of the invention.

The rotor shaft is supported in the drive end frame assembly 60 by the front bearing 16 and the slip ring frame assembly 70 by the rear bearing 18. The front bearing 16 is attached to the rotor shaft 24 outboard of the pulley 14, providing better support characteristics and eliminating or substantially reducing the cantilever forces on the front bearing 16. The rear bearing 18 rests in a bearing retainer 88 of the slip ring frame assembly 70 which extends around the slip rings and back to the rear bearing 18, proving protection from external contamination. The drive end frame assembly 60 does not extend between the pulley 14 and the centrifugal fan 12. Together with the use of a single fan, it is possible to reduce the overall length of the invention by a substantial amount in this fashion due to elimination of a wall and two axial clearance stackups.

Figure 2:
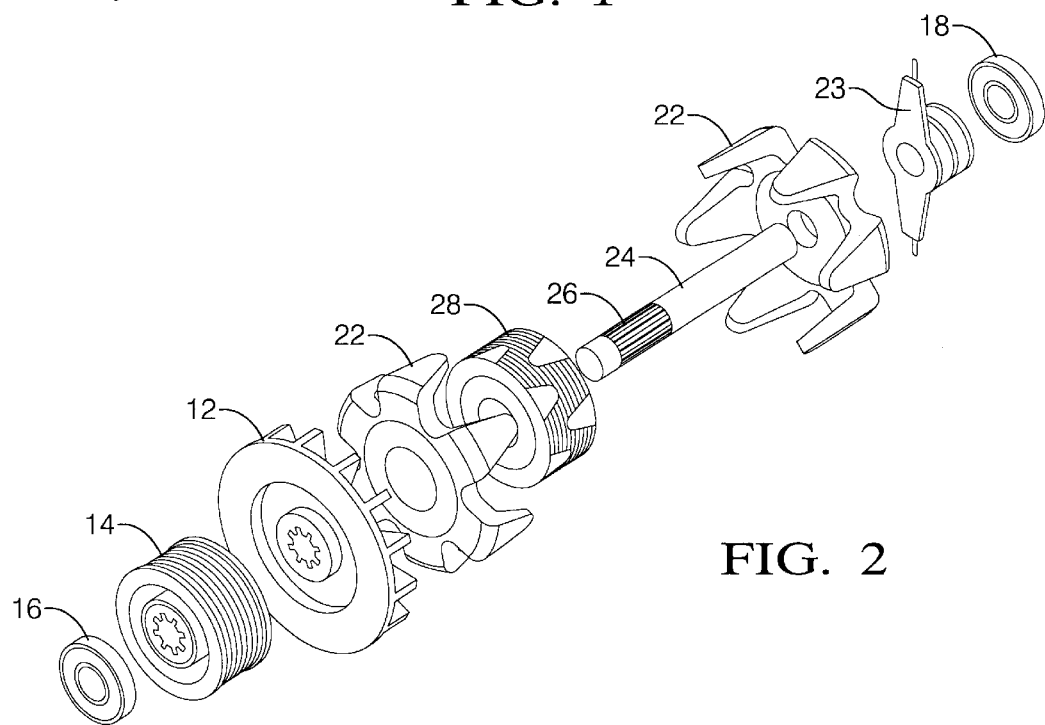
FIG. 2 is an exploded view of the rotor assembly of the present invention.

The rotor assembly is more clearly displayed in FIG. 2. The rotor shaft assembly has a front end and rear end which corresponding to the front and rear of the invention as shown in FIG. 1. A section of the rotor shaft near the front end is formed into a plurality of splines 26. The pulley 14 and centrifugal fan 12 are each designed to receive the splines 26 in a form fit fashion arrangement. The pulley 14 thus does not require an axial clamping nut to attach it to the rotor shaft 24. Instead, the pulley provides torque to the rotor shaft through the form fit spline arrangement and is held in place axially simply by being sandwiched, along with the centrifugal fan, between the front bearing 16 and a pawl shaped pole core 22. The remainder of the rotor assembly 10 is made up of a pair of pawl shaped pole cores 22, a core and coil assembly 28, and a slip ring assembly 27. The slip ring assembly 27 provides electrical contact with the rectifier assembly through brushes (not shown). The rotor assembly 10 is installed in the drive end frame assembly 60 and the slip ring frame assembly 70. The individual parts of the rotor assembly 10 are sandwiched between these frame assemblies, preventing axial movement.

The present invention has been described in an illustrative manner. It should be evident that modifications may be made to the specific embodiments described herein without departing from the spirit of the present invention, which is limited solely by the scope and spirit of the appended claims.

I claim:

1. An electric machine comprising:
   a fan;
   a rotor assembly;
   a stator assembly having end turns with a first outer diameter;
   said rotor assembly rotatably mounted within said stator assembly via a plurality of bearings;
   a housing for retaining said stator assembly; said housing extending the length of said stator assembly, said fan mounted on one end of the rotor assembly inboard of one end of said housing, said fan having a second outer diameter equal to said first outer diameter; and
   a pulley mounted at the same end of said rotor assembly outboard of said fan, wherein one of said plurality of bearings is outboard of said pulley.

2. The machine of claim 1 further comprising a plurality of inlet ports in said housing.

3. The machine of claim 1 wherein said housing further comprises scroll diffuser vanes extending radially outward of said fan.

4. The machine of claim 1 wherein said pulley is plastic.

5. An electric fan machine comprising:
   a fan;
   a rotor assembly;
   a stator assembly having end turns with a first outer diameter;
   said rotor assembly rotatably mounted within said stator assembly via a plurality of bearings;
   a housing for retaining said stator assembly, said housing extending the length of said stator assembly, said fan mounted on a first end of said rotor assembly inboard of one end of said housing, said fan having a second outer diameter equal to said first outer diameter; and
   a pulley;
   said pulley mounted at said first end of said rotor assembly outboard of said housing and inboard of one of said plurality of bearings, said machine having a plurality of inlet ports on a second end of said rotor assembly opposite said first end, said fan configured to draw air through said ports toward said fan.

6. The machine of claim 5 wherein said housing further comprises scroll diffuser vanes extending radially outward from said fan.

7. The machine of claim 5 wherein said pulley is plastic.

8. An electric machine comprising:
   a stator assembly having end turns with a first outer diameter;
   a fan located at a first end of said machine and configured to draw air through inlet ports toward said fin, said ports located at a second end opposite said first end, said fan having a second outer diameter equal to said first outer diameter;
   a pulley;
   said rotor further comprising a plurality of splines on one end; said pulley and said fan received by said splines in a low tolerance fit, further comprising a front bearing proximate one end of said rotor and a pole core wherein said pulley is between said beating and said core.

9. The machine of claim 8 wherein said pulley defines an inner opening shaped to receive said splines.

10. The machine of claim 8 wherein said fan defines an inner opening shaped to receive said splines.

11. An electric machine comprising:
    a stator assembly having end turns with a first outer diameter;
    a fan located at a first end of said machine and configured to draw air through inlet ports toward said fan, said ports located at a second and opposite said first end, said fan having a second outer diameter equal to said first outer diameter;
    a pulley;
    said rotor further comprising a plurality of splines on one end; said pulley and said fan received by said splines in a low tolerance fit, further comprising a front bearing proximate one end of said rotor and a pole core when said fan is between said bearing and said core.

12. An electric machine comprising:
    a fan;
    a rotor assembly;
    a stator assembly having end turns with a first outer diameter, said fan having a second outer diameter equal to said first outer diameter,
    said rotor assembly rotatably mounted within said stator assembly via a plurality of bearings;
    a housing for retaining said stator assembly; said housing extending the length of said stator assembly, said fan mounted on a first end of the rotor assembly inboard of one end of said housing;
    a pulley mounted at said first end of said rotor assembly outboard of said fan, wherein one of said plurality of bearings is outboard of said pulley, said machine having a plurality of inlet ports on second end of said rotor assembly opposite said first end, said fan configured to draw air through sad ports toward said fan.

13. The machine of claim 12 wherein said rotor comprises a plurality of splines on one end; said pulley and said fan received by said splines in a low tolerance fit.

14. The machine of claim 12 further comprising a front bearing proximate one end of said rotor and a pole core wherein said pulley is between said bearing and said core.

15. The machine of claim 12 further comprising a front bearing proximate one end of said rotor and a pole core wherein said fan is between said bearing and said core.

* * * * *